United States Patent
Vale (10) Patent No.: US 7,392,326 B2
(45) Date of Patent: Jun. 24, 2008

(54) METHOD FOR TEXT ENTRY IN AN ELECTRONIC DEVICE

(75) Inventor: Peter O. Vale, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 09/895,046

(22) Filed: Jun. 29, 2001

(65) Prior Publication Data

US 2002/0116528 A1 Aug. 22, 2002

Related U.S. Application Data

(60) Provisional application No. 60/269,432, filed on Feb. 16, 2001.

(51) Int. Cl.
G06F 15/16 (2006.01)

(52) U.S. Cl. .................. 709/245; 715/224; 715/225; 715/226; 715/256; 715/216; 709/201; 704/9

(58) Field of Classification Search ......... 709/206, 709/245, 201–203, 217–219; 345/810, 811, 345/816, 169; 715/507, 508, 812, 816, 780, 715/864
See application file for complete search history.

(56) References Cited

U.S. PATENT DOCUMENTS

| | | | | |
|---|---|---|---|---|
| 5,791,992 A * | 8/1998 | Crump et al. | ................... | 463/41 |
| 5,818,437 A | 10/1998 | Grover et al. | ................ | 455/566 |
| 5,828,991 A * | 10/1998 | Skiena et al. | .................... | 704/9 |
| 5,845,300 A * | 12/1998 | Comer et al. | ................ | 715/508 |
| 5,892,919 A * | 4/1999 | Nielsen | ....................... | 709/245 |
| 5,896,321 A * | 4/1999 | Miller et al. | ........... | 365/189.01 |
| 5,945,928 A | 8/1999 | Kushler et al. | ............... | 707/535 |
| 5,953,541 A | 9/1999 | King et al. | ................... | 345/352 |
| 5,963,950 A * | 10/1999 | Nielsen et al. | ............... | 707/102 |
| 5,977,969 A * | 11/1999 | DiAngelo | .................... | 715/780 |
| 6,009,459 A * | 12/1999 | Belfiore et al. | .............. | 709/203 |
| 6,011,554 A | 1/2000 | King et al. | .................... | 395/887 |
| 6,092,100 A * | 7/2000 | Berstis et al. | ................ | 709/203 |
| 6,170,000 B1 | 1/2001 | Bories et al. | ................... | 341/28 |
| 6,204,848 B1 * | 3/2001 | Nowlan et al. | .............. | 715/810 |
| 6,223,059 B1 * | 4/2001 | Haestrup | ..................... | 345/172 |
| 6,229,532 B1 * | 5/2001 | Fujii | ........................... | 715/810 |
| 6,338,082 B1 * | 1/2002 | Schneider | .................... | 709/203 |
| 6,392,640 B1 * | 5/2002 | Will | ............................ | 345/184 |
| 6,460,060 B1 * | 10/2002 | Maddalozzo et al. | ........ | 715/513 |
| 6,529,187 B1 * | 3/2003 | Dickelman | ................... | 345/169 |
| 6,564,213 B1 * | 5/2003 | Ortega et al. | .................... | 707/5 |

(Continued)

*Primary Examiner*—Bunjob Jaroenchonwanit
*Assistant Examiner*—Dohm Chankong
(74) *Attorney, Agent, or Firm*—Merchant & Gould (57) ABSTRACT

A method for text entry in an electronic device is disclosed. As a user enters text, such as a URL, into a handheld device the entered text is matched to previously visited URLs and these matched URLs are displayed in a list. The entered text may also be matched to any stored list of URLs or text. Typically, the matching searches for any instances of the entered text no matter the location of the entered text in the matched string. If one of the listed URLs is the URL desired by the user, then the user may select that URL and navigate a web browser to the URL without entering any more text. One of the items in the list may be the entered text with an automatically added prefix and suffix. These features significantly reduce the difficulty of entering URLs, especially on a device with limited input capabilities.

18 Claims, 4 Drawing Sheets

U.S. PATENT DOCUMENTS

| | | | |
|---|---|---|---|
| 6,615,237 B1 * | 9/2003 | Kyne et al. | 709/203 |
| 6,651,217 B1 * | 11/2003 | Kennedy et al. | 715/224 |
| 6,667,751 B1 * | 12/2003 | Wynn et al. | 715/833 |
| 6,708,214 B1 * | 3/2004 | La Fleur | 709/226 |
| 6,847,959 B1 * | 1/2005 | Arrouye et al. | 707/2 |
| 6,895,559 B2 * | 5/2005 | Forder | 715/780 |
| 6,922,810 B1 * | 7/2005 | Trower et al. | 715/256 |
| 7,136,932 B1 * | 11/2006 | Schneider | 709/245 |
| 7,177,797 B1 * | 2/2007 | Micher et al. | 704/9 |
| 7,293,231 B1 * | 11/2007 | Gunn et al. | 345/179 |
| 2002/0062342 A1 * | 5/2002 | Sidles | 709/203 |

* cited by examiner

METHOD FOR TEXT ENTRY IN AN ELECTRONIC DEVICE

RELATED APPLICATIONS

This application claims the benefit of U.S. Provisional Application No. 60/269,432, filed Feb. 16, 2001.

TECHNICAL FIELD

The invention generally relates to a text input method for an electronic device, and even more particularly, relates to a method for entering an Internet address into an electronic device with limited text entry capabilities.

BACKGROUND OF THE INVENTION

As more handheld electronic devices, such as wireless telephones and personal digital assistants (PDAs), are able to browse the Internet, the need to enter a specific Internet address, such as a Universal Resource Locator (URL), on these devices becomes more common. Typically, the text input methods for handheld devices are inefficient. For example, a wireless telephone typically includes a keypad rather than a keyboard. Keypads are designed first and foremost for entering numerals, such as the numerals of a telephone number. Entering letters into a wireless telephone using a keypad is a slow and awkward process because the keypad may have to be selected numerous times to enter a single letter. For example, to enter the letter "c", the "2" button on the keypad is selected three times. Moreover, even if one of these handheld electronic devices includes a keyboard, the size limitations of the handheld device require that the keyboard have small keys that make the keyboard difficult to use.

Most web browsers for handheld devices do not focus on entering URLs because the text input is so difficult. Instead, users are encouraged to stay within a preset list of links that are provided by default. When a link from the preset list is selected, only navigation is necessary and text input is avoided. However, as more people use handheld devices to browse the Internet, the preset list of links is not enough to satisfy all users. These users often try to enter new URLs to get to the websites they want to view and encounter the input deficiencies described above.

Thus, there is a need for an improved method and system for entering text, such as a URL, into an electronic device with limited text entry capabilities.

SUMMARY OF THE INVENTION

In one embodiment, the present invention attempts to aid a user in entering text, such as a URL, into a handheld device by matching the entered text to previously visited URLs and displaying these URLs in a list. The entered text may also be matched to any stored list of URLs or text. Typically, the matching searches for any instances of the entered text no matter the location of the entered text in the matched string. For example, if the entered text is "ample", then the URL "www.example.com" may be returned even though it begins with "www" and even though the string "example" begins with "ex". In other words, in one embodiment of the invention, if the entered text is found anywhere in a searched URL, then that URL is returned as a possible match.

If one of the listed URLs is the URL desired by the user, then the user may select that URL and navigate a web browser to the URL without entering any more text. In some embodiments, the invention also automatically adds a prefix and suffix to the text entered by the user and displays the combined text as one of the URLs in the list. These features significantly reduce the difficulty of entering URLs, especially on a device with limited input capabilities, while also allowing users the freedom to browse to the Internet addresses they want to view.

When entering a URL into a web browser using an embodiment of the present invention, a user begins by entering text by some means, such as keyboard 32 (FIG. 1), a keypad, a voice recognition engine, a handwriting recognition engine, a touchscreen display 28 (FIG. 1), or another input mechanism well-known to those skilled in the art. After at least one character of text is entered, the user may choose one of the following options:

the user may continue to enter text;

the user may attempt to browse to the URL that they have entered;

the browser automatically attaches a prefix and a suffix to any single word entered and provides this item in a list, allowing the user to select that item and browse to it as the desired URL; or the browser automatically matches the text that has been entered to any previously viewed URLs in the browser's history, cache, or recently entered addresses and provides any matches to the user in a list, allowing the user to select one of the items and browse to it as the desired URL.

These and other features, advantages, and aspects of the present invention may be more clearly understood and appreciated from a review of the following detailed description of the disclosed embodiments and by reference to the appended drawings and claims.

DETAILED DESCRIPTION OF EMBODIMENTS OF THE INVENTION

An embodiment of the present invention is incorporated into a web browser program module that is used in conjunction with a handheld electronic device, such as a personal digital assistant (PDA). The invention may also be incorporated into a web browser program module for use in conjunction with a wireless telephone such as a cellular telephone or a personal communications service (PCS) telephone. In other embodiments, the invention may be incorporated into a web browser for use on any type of computing device such as a personal computer, workstation, etc. embodiments, the invention may be incorporated into a web browser for use on any type of computing device such as a personal computer, workstation, etc.

In one embodiment of the invention, when a user begins entering a Universal Resource Locator (URL) into the web browser, the end user is provided with a list of URLs. The list of URLs is provided by analyzing the entered characters and displaying the URLs that the user is most likely attempting to enter. Typically, a history folder or a memory cache is searched to find URLs that match the text entered by the user. The user may then select one of the displayed URLs or continue entering characters.

In some embodiments, the present invention automatically adds a suffix and/or a prefix to the text the user is entering and displays the combined text as one of the options in the list of URLs. For example, the invention may automatically add a "www." and a ".com" to the text the user is entering and display this combined text as one of the options so that the user does not have to enter the suffix and prefix. Thus, many of the awkward acts associated with current methods of entering text using a handheld electronic device may be avoided because the user typically only has to enter a few characters before selecting the URL that is desired.

Having briefly described the present invention, an exemplary operating environment for the invention will be described in reference to FIG. 1.

Exemplary Operating Environment

Figure 1:
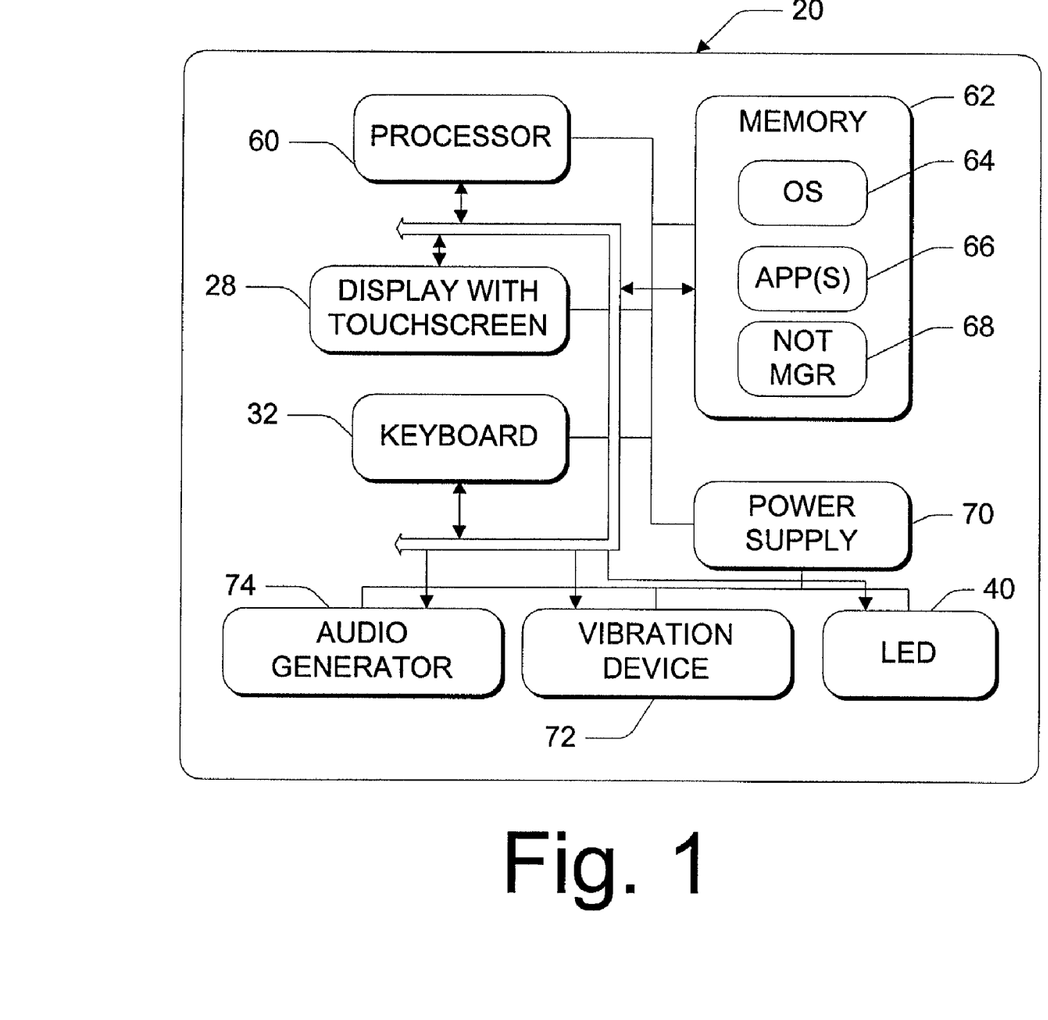
FIG. 1 is a block diagram of a handheld computing device that provides the exemplary operating environment for an embodiment of the present invention.

FIG. 1 and the following discussion are intended to provide a brief, general description of a suitable computing environment in which the invention may be implemented. It should be understood that the computing environment in FIG. 1 is exemplary only and is not meant to limit the invention. FIG. 1 describes a computing environment such as may be found in a handheld computing device, such as a PDA. However, it should be understood that the present invention is not limited to PDAs. The invention may be practiced with other computer system configurations, including multiprocessor systems, microprocessor-based or programmable consumer electronics, network PCs, minicomputers, mainframe computers, wireless telephones, pagers and the like. The invention may also be practiced in distributed computing environments where tasks are performed by remote processing devices that are linked through a communications network. In a distributed computing environment, program modules may be located in both local and remote memory storage devices.

Although not required, the invention will be described in the context of computer-executable instructions, such as program modules, being executed by a computing device. Generally, program modules include routines, programs, objects, components, data structures, etc. that perform particular tasks or implement particular abstract data types.

With reference to FIG. 1, an exemplary system for implementing the invention includes a handheld computing device 20. The computing device 20 has a processor 60, a memory 62, a display 28, and a keyboard 32. The memory 62 generally includes both volatile memory (e.g., RAM) and non-volatile memory (e.g., ROM, PCMCIA cards, etc.). An operating system 64 is resident in the memory 62 and executes on the processor 60. The handheld computing device 20 includes an operating system 64 such as the "WINDOWS® CE" operating system from Microsoft Corporation or another operating system.

One or more application programs 66 are loaded into memory 62 and run on the operating system 64. Examples of applications include e-mail programs, scheduling programs, PIM (personal information management) programs, word processing programs, spreadsheet programs and so forth. Another example of an application program 66 is a web browser program module such as the "POCKET INTERNET EXPLORER" web browser from Microsoft Corporation or another web browser.

The handheld computing device 20 also has a notification manager 68, loaded in memory 62, which executes on the processor 60. The notification manager 68 handles notification requests from the applications 66.

The handheld computing device 20 has a power supply 70, which is implemented as one or more batteries. The power supply 70 might further include an external power source that overrides or recharges the built-in batteries, such as an AC adapter or a powered docking cradle.

The handheld computing device 20 is also shown with three types of external notification mechanisms: an LED 40, a vibration device 72, and an audio generator 74. These devices are directly coupled to the power supply 70 so that when activated they remain on for a duration dictated by the notification mechanism even though the processor and other components might shut down to conserve battery power. The LED 40 preferably remains on indefinitely until the user takes action. The current versions of the vibration device 72 and audio generator 74 use too much power for today's handheld computing device's batteries, and so they are configured to turn off when the rest of the system does or at some finite duration after activation.

The handheld computing device 20 may also include a transmitter (not shown) and a receiver (not shown) for communicating with a wireless network such as a PCS or cellular network. The transmitter is used to convert speech, text or other data into electrical impulses for transmission. The receiver is used to receive transmission signals and reproduce them in their original form (audio, video, etc.). The handheld computing device 20 may also include a wireless modem (not shown) well-known to those skilled in the art so that the device 20 may be used to view and interact with the content of a global computer network such as the Internet.

Intelligent Text Entry Mechanism

In one embodiment, the present invention attempts to aid a user in entering text, such as a URL, into a handheld device by matching the entered text to previously visited URLs and displaying these URLs in a list. If one of the listed URLs is the URL desired by the user, then the user may select that URL and navigate a web browser to the URL without entering any more text. In some embodiments, the invention also automatically adds a prefix and suffix to the text entered by the user and displays the combined text as one of the URLs in the list. These features significantly reduce the difficulty of entering URLs, especially on a device with limited input capabilities, while also allowing users the freedom to browse to the Internet addresses they want to view.

When entering a URL into a web browser using an embodiment of the present invention, a user begins by entering text by some means, such as keyboard 32 (FIG. 1), a keypad, a voice recognition engine, a handwriting recognition engine, a touchscreen display 28 (FIG. 1), or another input mechanism well-known to those skilled in the art. After at least one character of text is entered, the user may choose one of the following options:

1. The user may continue to enter text;
2. The user may attempt to browse to the URL that they have entered;
3. The browser automatically attaches a prefix and a suffix to any single word entered and provides this item in a list, allowing the user to select that item and browse to it as the desired URL; or
4. The browser automatically matches the text that has been entered to any previously viewed ULRLs in the browser's history, cache, or recently entered addresses and provides any matches to the user in a list, allowing the user to select one of the items and browse to it as the desired URL.

The first option allows the user to enter text until the list of matches (provided by options 3 and 4) is thinned out, or until the desired URL is fully entered and is used for browsing (option 2).

The third option allows the browser to add one or more prefix and suffix combinations to any single word entry (a single word is considered the text until a period is entered) and provide them at the top of the list of matches to the user. For example, consider a user that wants to browse to the URL "www.foo.com". If the browser is being used in North America, the prefix "www" and the suffix "com" are very common in North America and the browser may be configured to provide those by default. Thus, the user simply needs to enter the text "foo" into the web browser and the item "www.foo.com" will be added at the top of the list of URLs that match the word "foo". The user may then select this URL from the list and the web browser will navigate to the address "www.foo.com".

The fourth option allows the user to select the desired URL from a list of possible matches for the current text based on URLs that have been visited before. This option is provided because selection from a list is much easier than text entry, especially when dealing with lengthy URLs and an inefficient text input method. As an example of the fourth option, consider again the user that wants to browse to the URL "www.foo.com". If the user has previously visited this address, then simply typing in "f" will match to the "foo" part of the URL (saved in the history folder) and the URL will be returned as an item in the list. If there are many matches, the user can cull the list by typing in more letters to make the matches more accurate. If the user sees the desired URL in the list, then the user may select the desired URL and the web browser will navigate to that URL.

In a preferred embodiment, the options described above may be presented to the user in a "Go to . . . " menu as described below.

"Go to . . . " menu

Figure 2:
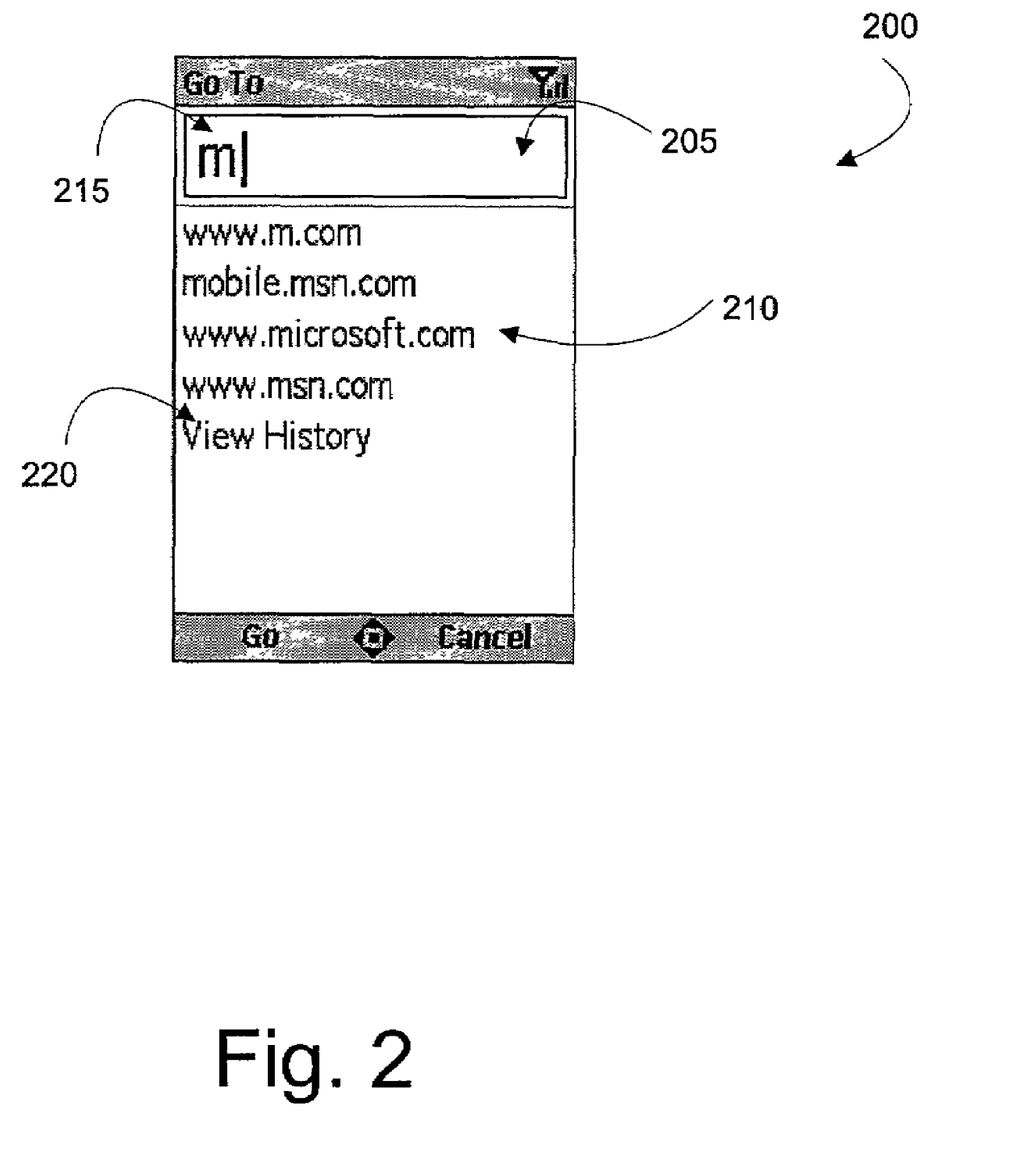
FIG. 2 is an illustration of an exemplary "Go to . . . " menu in accordance with an embodiment of the present invention.

Referring now to FIG. 2, an exemplary "Go to . . . " menu 200 will be described. The "Go to . . . " menu 200 is a menu displayed on the display 28 of handheld computing device 20 by a web browser program module. The "Go to . . . " menu 200 allows a user to enter an Internet address, such as a URL, manually into an address field 205, or text entry field. The "Go to . . . " menu allows a user to browse to an Internet address even if there is not a preset link to the address. In a preferred embodiment of the "Go to . . . " menu, the URL that was last visited using the web browser will be displayed and will be fully selected by default when the "Go to . . . " menu is first displayed. This allows the user to modify the last visited URL by moving the cursor to the desired position in the string or to start a new URL by entering a new character.

The "Go to . . . " menu also includes a list 210 of site matches that may be automatically displayed to the user. Alternatively, the list 210 may be displayed in response to the user selecting to open the list 210 such as by selecting a button, a tab, an arrow, etc. To generate the list 210, the text 215 that the user is entering is matched to pages in a history list/folder, the cache of the device, the most recently entered links or another stored list of Internet addresses. Potential matches are displayed in the list 210. The user may select one of the potential matches in the list 210 by scrolling through the list and pressing a key, button or control to navigate to a link and the web browser will navigate to the selected site.

In a preferred embodiment, input focus remains in the address field 205, even when an item in the list 210 is highlighted. Thus, if a user begins typing while focus is in the list 210, the focus will return to the address field and the characters will be added to the text 215 in the address field.

If the user only types one word into the address field 205, then the first entry in the potential match list will be that word with a prefix and a suffix (such as www. and .com) surrounding it. For example, as illustrated in FIG. 2, the user has entered the text "m" into the address field and the first entry in the list 210 is www.m.com. Of course, in other embodiments, other prefixes and suffixes may also be added to the text. For example, the registry may be searched to determine if there are other prefixes and suffixes that may need to be added to the text. The prefix and suffix typically will be configurable in the registry. For example, different default prefixes and suffixes may be defined by the user based on the locale.

The last entry in the list 210 may be a "View History" option 220. This option is typically shown even if there are no other entries in the list. Selecting this option displays a history screen showing all links in the user's history list sorted chronologically. The user may then select one of the URLs from the history list and the web browser will navigate to that URL.

Figure 3:
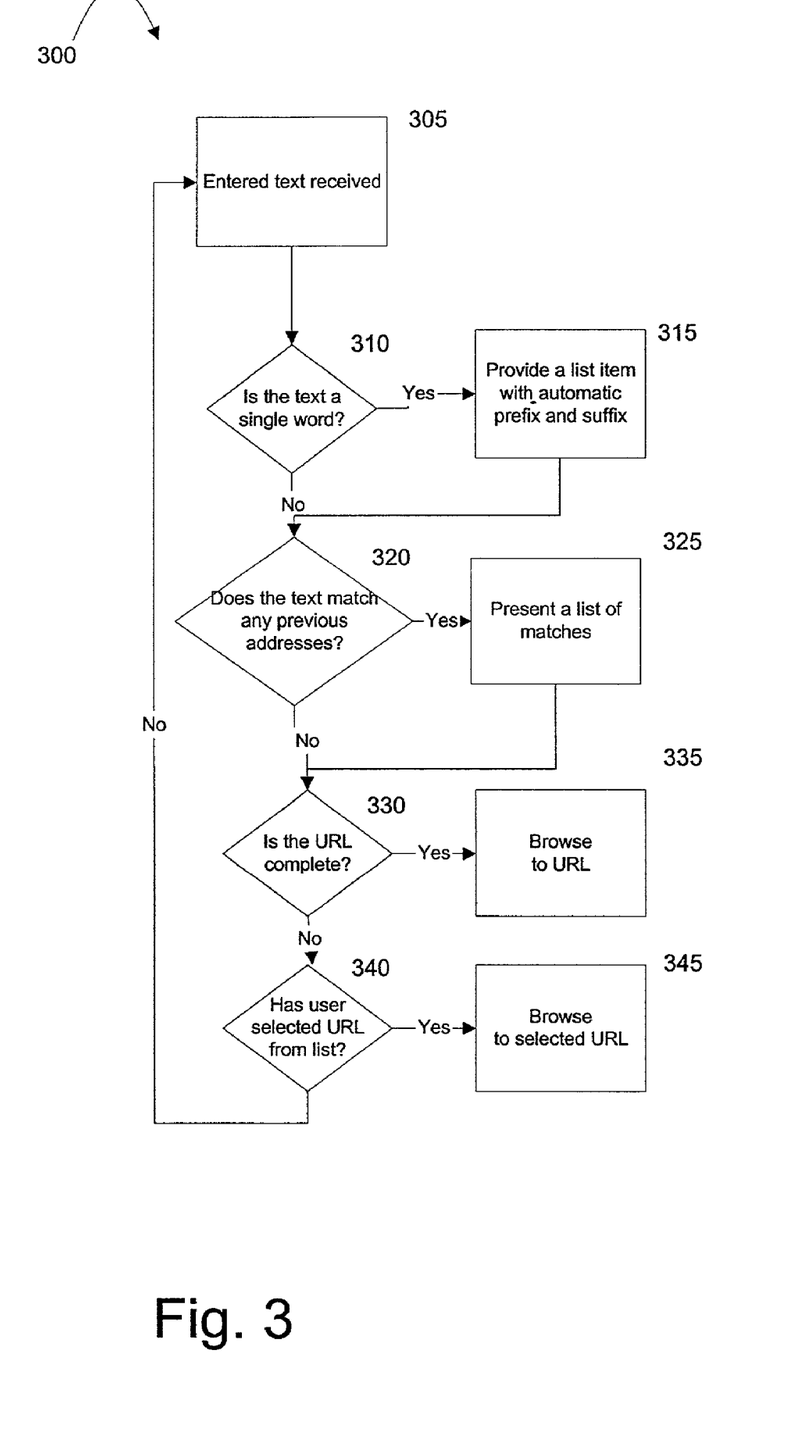
FIG. 3 is a flow diagram illustrating a method for entering a URL into a web browser in accordance with an embodiment of the present invention.

Referring now to FIG. 3, a flow diagram illustrating a method 300 for entering a URL into a web browser in accordance with an embodiment of the present invention will be described. Those skilled in the art will appreciate that the logic flow diagram of FIG. 3 is executed by the processor 60 (FIG. 1) in response to instructions that have been incorporated into one of the application program modules 66 (FIG. 1).

The method 300 begins at step 305 when the user begins entering text for a URL and the text is received by the application program 66. At decision step 310, it is determined whether the text is a single word. In a preferred embodiment, a single word is considered the text until a period is entered. If the text is a single word, i.e., no period has been entered yet, then the method proceeds to step 315. At step 315, an item in the list 210 is provided corresponding to the single word with an automatic prefix and suffix added to it. The method then proceeds to decision step 320.

At decision step 320, it is determined whether the text matches any previous addresses entered in the web browser. The previous addresses may include addresses of any previously viewed URLs in the browser's history list/folder, cache, or recently entered addresses. Of course, in alternative embodiments, the text may be matched against any stored list of addresses. For example, a stored list of addresses may be included with the web browser and the text may be matched against this list (even if the user has never visited that address). If the text matches any previous addresses, then the method proceeds to step 325 where the list of matches is presented to the user in the list 210 (FIG. 2). The method then proceeds to decision step 330.

At decision step 330, it is determined whether the URL is complete, in other words, whether the user is ready to navigate to the URL in the address list 205 (FIG. 2). For example, if the user is ready to navigate to the address listed in the address field 205 (FIG. 2), then the URL is complete. If the URL is complete, then the method proceeds to step 335 and the web browser navigates to the URL.

If the URL is not complete, then the method proceeds to decision step 340 where it is determined whether the user has selected one of the URLs in the list 210. If so, then the method proceeds to step 345 and the web browser navigates to the selected URL.

If the user does not select one of the URLs in the list 210, then the method returns to step 305 to wait for the user to enter more text of the URL.

Figure 4:
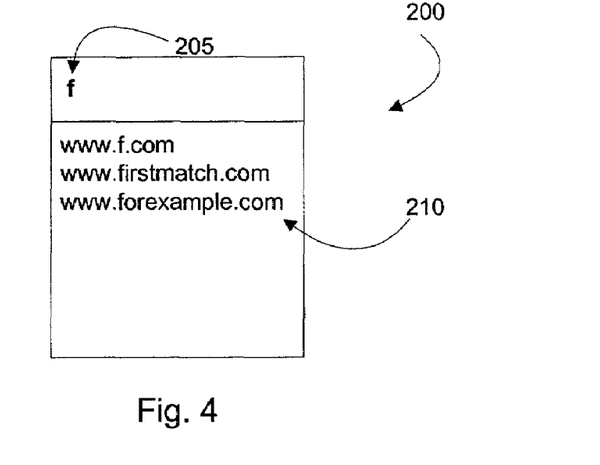
FIGS. 4-6 are illustrations of an exemplary "Go to . . . " menu in accordance with an embodiment of the present invention as text is entered into the menu.
Figure 5:
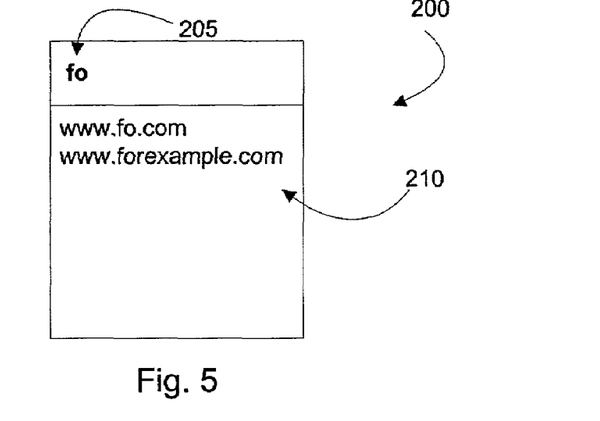
Figure 6:
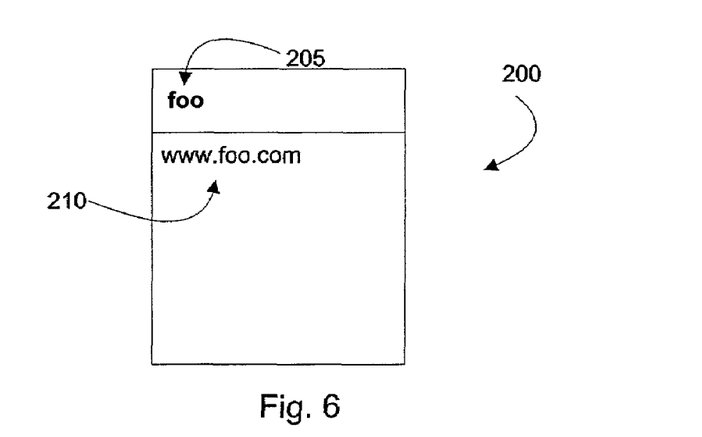

Referring now to FIGS. 4-6, several examples illustrating an embodiment of the present invention will be described. FIGS. 4-6 illustrate the changes made to the list of matches in a "Go to . . . " menu 200 as the user enters text.

In FIG. 4, the user has entered the text "f" into the address field 205 of the "Go to . . . " menu 200. Listed first in the list of possible matches is the text "f" with the prefix "www." and the suffix ".com". The list of possible matches also includes the URLs "www.firstmatch.com" and "www.forexample.com" based upon searching for possible matches in the addresses of any previously viewed URLs in the browser's history list/folder, cache, and/or recently entered addresses. Not shown in FIG. 4 is the "View History" option. Note that the "View History" option, when selected, will display all addresses previously viewed in a chronological manner even if the address does not match the text in the address field.

Also note that, as illustrated in FIG. 2, the list 210 of possible matches may include matches without the "www" prefix such as the URL "mobile.msn.com". Thus, the search engine for returning possible matches to the entered text may be capable of ignoring the prefix and suffix of old addresses in finding potential matches. The search engine may specifically search for URLs that begin with the text entered into the address field. For example, if the user enters the text "f", then only URLs beginning with the letter "f" are returned and displayed in the list.

However, in a preferred embodiment of the invention, the search for possible matches returns any matches to the string typed into the address field. A match may include any previously visited addresses that include the string typed into the address field without regard to where in the address the text appears. For example, suppose the user enters the string "ample" into the address field. Then, the search would return the address "www.example.com" if that address is in the history list or any of the other memory locations searched. All addresses that are searched that include the entered string in their address would be returned. In a preferred embodiment, the addresses are displayed in alphabetical order. Of course, a hierarchical approach to displaying the results may be used so that the result the user expects most is listed before others. For example, if the user enters the string "ample" into the address field, then the address "www.amplemoney.com" from the history list would be listed above the address "www.example.com" because it is more likely the user is attempting to enter the "www.amplemoney.com" address. Other similar well-known heuristics may be used to categorize and organize the search results in a manner that the user expects.

Referring now to FIG. 5, the user has entered the text "fo" into the address field 205. Listed first in the list of possible matches is the text "fo" with the prefix "www." and the suffix ".com". Notice that the list of possible matches has been narrowed to eliminate the URL "www.firstmatch.com" because the text "firstmatch" does not include the string "fo".

Referring now to FIG. 6, the user has entered the text "foo" into the address field 205. Listed first in the list of possible matches is the text "foo" with the prefix "www." and the suffix ".com". Notice that the list of possible matches has been narrowed to eliminate the URL "www.forexample.com" because the text "forexample" does not include the string "foo". Note that if the URL "www.foo.com" had been visited before and stored in one of the searched memory locations, then it may have been listed in the list of possible matches in FIG. 4.

It should be understood that although the present invention has been described in reference to mobile electronic devices with limited text entry capabilities, the present invention may also be implemented in other environments as will be understood by those skilled in the art. It should be understood that the present invention may be incorporated into any web browser program module. For example, the present invention may be incorporated into a web browser program module for a desktop personal computer.

It should also be understood that the present invention may be extended to entering other text besides URLs. For example, the text entered by the user may be compared to text in a dictionary to provide the user with a list of possible text the user is attempting to enter.

It should be understood that the foregoing pertains only to the preferred embodiments of the present invention, and that numerous changes may be made to the embodiments described herein without departing from the spirit and scope of the invention.

I claim:

1. A computer-implemented method for entering an address into a web browser of a mobile device, comprising:
   receiving one character of text;
   determining whether the one character of text comprises a single word wherein determining whether the one character of text comprises the single word comprises determining, prior to receiving another character of text, that the one character of text comprises a character other than a period;
   displaying, when it is determined that the one character of text does not comprise the single word, a string list in the web browser with a string list item wherein the string list item comprises a text string containing at least one instance of the character without regard to the location of the character within the text string;
   configuring at least one automatic prefix and at least one automatic suffix associated with a geographic location of the mobile device wherein configuring the at least one automatic prefix and the at least one automatic suffix associated with the geographic location of the mobile device comprises storing the at least one automatic prefix and the at least one automatic suffix in a registry;
   displaying, when it is determined that the one character of text comprises the single word, a list in the web browser with a list item wherein the list item comprises the one character of text with the automatic prefix added before the one character of text and the automatic suffix added after the one character of text;
   receiving, when it is determined that the one character of text comprises the single word, the another character of text; and
   determining, in response to determining that the one character of text comprises the single word, whether the combination of the one character of text and the another character of text comprises the single word wherein determining whether the combination of the one character of text and the another character of text comprises the single word comprises determining, prior to receiving yet another character of text, that the another character of text comprises the character other than a period.

2. The method of claim 1 wherein the automatic prefix is "www.".

3. The method of claim 2 wherein the automatic suffix is ".com".

4. The method of claim 1 wherein the mobile device is a wireless telephone.

5. The method of claim 1 further comprising:
determining whether the one character of text matches any previous addresses entered into the web browser; and
if so, then displaying the possible matches as list items in the list.

6. The method of claim 5 wherein determining whether the one character of text matches any previous addresses entered into the web browser comprises searching the addresses of any previously viewed URLs in the browser's history, cache, or recently entered addresses for potential matches.

7. The method of claim 5 further comprising:
determining whether the user is ready to navigate to the URL defined by the one character of text; and
if so, then navigating the web browser to display a page defined by the one character of text.

8. The method of claim 7 wherein the one character of text is displayed in an address field.

9. The method of claim 7 further comprising:
determining whether one of the list items in the list has been selected by the user; and
if so, then navigating the web browser to display a page located at an address defined by the selected list item.

10. The method of claim 9 further comprising if one of the list items in the list has not been selected by the user, then receiving another character of text.

11. The method of claim 1 wherein the one character of text is received in response to a user selecting keys on a keypad of a wireless telephone.

12. The method of claim 1 wherein the automatic prefix and the automatic suffix may be modified to a desired prefix and a desired suffix.

13. The method of claim 12 wherein the automatic prefix and automatic suffix are modified by receiving input from a user requesting that the automatic prefix be set to a first string and that the automatic suffix be set to a second string.

14. The method of claim 13 wherein the automatic prefix and the automatic suffix are stored in a registry.

15. A computer-implemented method for text entry in an electronic device, the method comprising:
receiving one character of text;
configuring at least one automatic prefix and at least one automatic suffix associated with a geographic location of the mobile device wherein configuring the at least one automatic prefix and the at least one automatic suffix associated with the geographic location of the mobile device comprises storing the at least one automatic prefix and the at least one automatic suffix in a registry;
determining whether the one character of text comprises a single word wherein determining whether the one character of text comprises the single word comprises determining, prior to receiving another character of text, that the one character of text comprises a character other than a period;
when it is determined that the one character of text comprises the single word, adding the automatic prefix and the automatic suffix to the one character of text to form a combined address and displaying the combined address as an entry in a selection list;
when it is determined that the one character of text does not comprise a single word, not adding the automatic prefix and the automatic suffix to the one character of text to form a combined address and not displaying the combined address as an entry in the selection list and displaying a string list in the web browser with a string list item wherein the string list item comprises a text string containing at least one instance of the character without regard to the location of the character within the text string;
searching, when it is determined that the one character of text comprises the single word, a history folder in the electronic device to find at least one address with the one character of text, the history folder comprising universal resource locators previously viewed by a user from a web browser program module;
displaying, when it is determined that the one character of text comprises the single word, the at least one address in the selection list;
receiving, when it is determined that the one character of text does not comprise the single word, the another character of text; and
determining, when it is determined that the one character of text does not comprise the single word, whether a combination of the one character of text and the another character of text comprises the single word wherein determining whether the combination of the one character of text and the another character of text comprises the single word comprises determining, prior to receiving yet another character of text, that the another character of text comprises the character other than a period.

16. The method of claim 15 wherein the selection list is a selection list in the web browser program module and the combined address and the plurality of addresses comprise URLs for Internet addresses.

17. The method of claim 16 further comprising receiving an input selecting the one character of text and navigating the web browser program module to view a web page located at an address defined by the one character of text.

18. The method of claim 16 further comprising receiving an input selecting the combined address and navigating the web browser program module to view a web page located at the combined address.

* * * * *